No. 661,108. Patented Nov. 6, 1900.
A. SCHMITZ.
MANUFACTURE OF COMPOUND TUBES.
(Application filed Dec. 4, 1899.)
(No Model.)

Witnesses:

Inventor:
Albert Schmitz
by
Attorney.

UNITED STATES PATENT OFFICE.

ALBERT SCHMITZ, OF RAUNHEIM-ON-THE-MAIN, GERMANY.

MANUFACTURE OF COMPOUND TUBES.

SPECIFICATION forming part of Letters Patent No. 661,108, dated November 6, 1900.

Application filed December 4, 1899. Serial No. 739,175. (No model.)

*To all whom it may concern:*

Be it known that I, ALBERT SCHMITZ, a citizen of the Grand Duchy of Hesse, and a resident of Frankfurterstrasse 50, Raunheim-on-the-Main, in the Grand Duchy of Hesse, German Empire, have invented certain new and useful Improvements in the Manufacture of Welded Tubes and Pipes, of which the following is a specification.

The object of my present invention is a process for manufacturing welded tubes and pipes the walls of which are composed of several layers of sheet metal, which are welded together, so as to form one solid body.

In the accompanying drawings the process is shown in its different stages.

Figure 1:
Figure 2:
Figure 3:
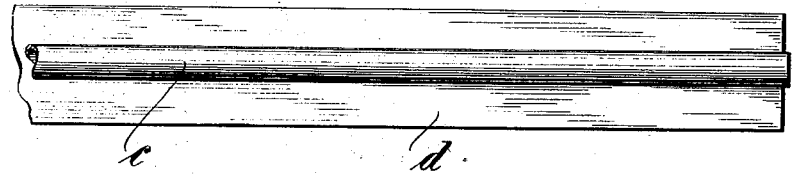
Figure 4:
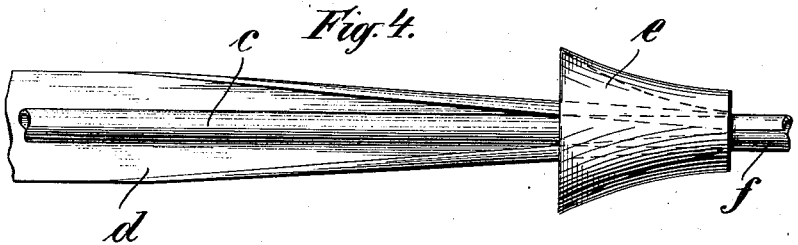
Figure 5:
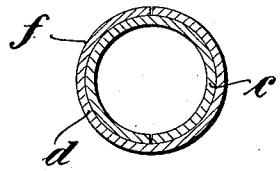

Figure 1 shows a strip of sheet metal out of which the pipe is formed. Fig. 2 shows the drawing of said strip through a drawing-hole and the formation of the pipe. Fig. 3 shows the thus-formed pipe placed on a second strip of sheet metal, and Fig. 4 shows both passed through a second drawing-hole. Fig. 5 is a cross-section through the pipe formed by this process.

A strip $a$ of sheet-iron is drawn through a drawing-hole $b$, and thereby a tube $c$ is formed. This tube is placed upon a second strip $d$ of sheet-iron, &c., and drawn through a second draw-hole $e$, whereby this second strip also forms a pipe $f$, surrounding closely the first one. In selecting proper dimensions for the strips and the drawing-holes a pipe with double walls is formed, which are intimately pressed together. The same process may be further repeated, thereby strengthening the walls of the pipes by further thicknesses of metal. The drawing-holes are cone-shaped, and the walls are thickest at their apex or smallest end and taper to a fine edge at their opposite end, as shown by the dotted lines in Figs. 2 and 4, so that when the plate is inserted at the largest end it will readily bend and encircle the inner wall of the apex of the same. Thus it will be seen that the wall of the drawing-hole is thickest at the point where it receives its greatest strain. In placing the pipe $c$ on the second strip $d$ care must be taken to so place it that its seam will not coincide with the seam formed by the edges of the second strip $d$.

The strip $a$ may be heated to a welding heat before passing it through the drawing-hole $b$. Then its rims will be welded together after leaving the same; but the drawing may also take place in red heat or in cold. Then of course no welding takes place. The second strip $d$ of sheet metal also may be heated either to the welding temperature or only to red heat, or it may even be left cold. In case the welding does not take place in the first operation the ready-formed pipe is ultimately brought to the welding heat and passed through a drawing-hole of proper dimensions or through rollers, thereby welding the whole together.

What I claim is—

The process of making compound tubes which consists in forming a tube from a flat skelp, placing the tube so formed upon another flat skelp and drawing said tube and skelp simultaneously through a die whereby the second skelp is formed into a tube around the first-named tube, with their joints out of alinement, substantially as described.

In testimony whereof I affix my signature in presence of two witnesses.

ALBERT SCHMITZ.

Witnesses:
 WOLDEMAR HAUPT,
 HENRY HASPER.